(No Model.) 2 Sheets—Sheet 1.
J. L. MACDONALD & G. E. SLY.
THRASHING MACHINE.
No. 253,874. Patented Feb. 21, 1882.
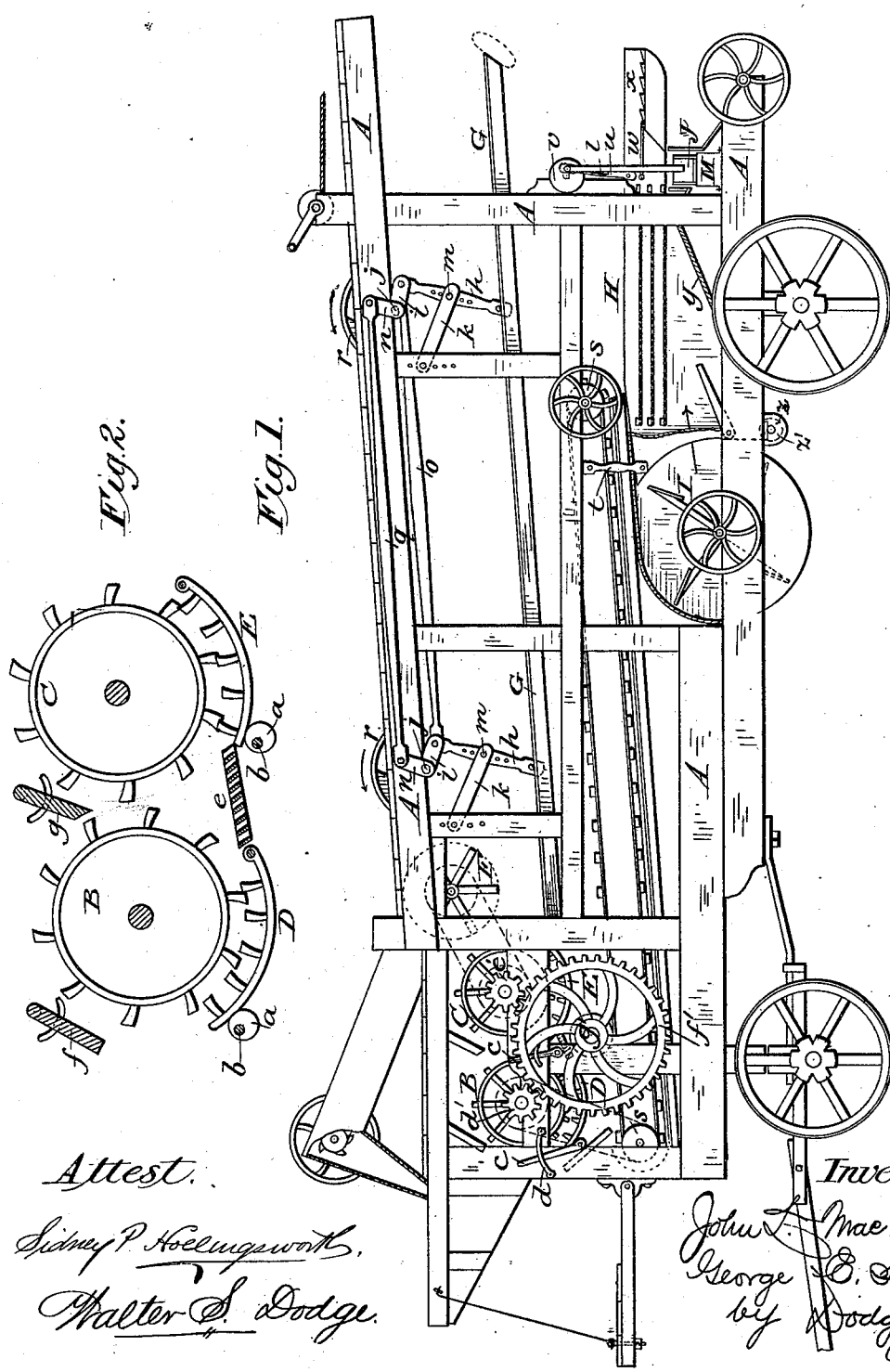
Attest.
Sidney P. Hollingsworth,
Walter S. Dodge.
Inventors.
John L. MacDonald,
George E. Sly,
by Dodge & Son,
Attys.

(No Model.) 2 Sheets—Sheet 2.
J. L. MACDONALD & G. E. SLY.
THRASHING MACHINE.
No. 253,874. Patented Feb. 21, 1882.
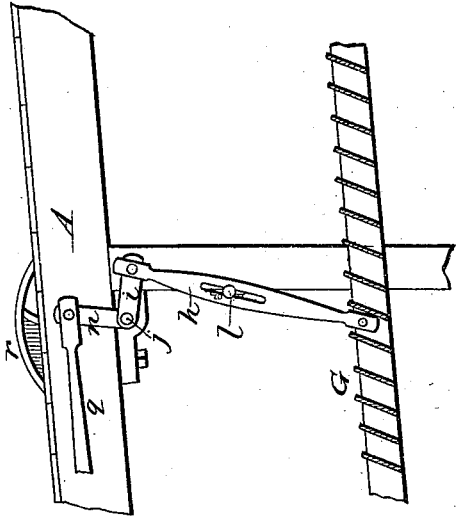
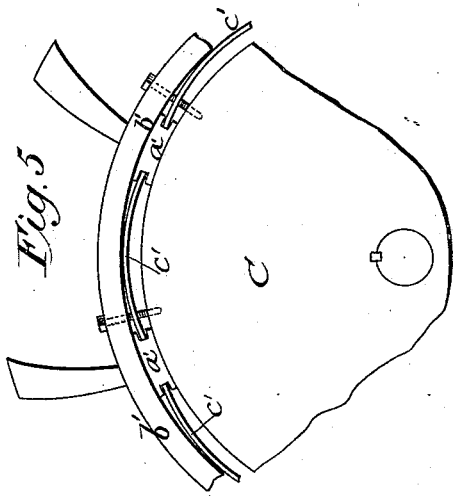

UNITED STATES PATENT OFFICE.

JOHN L. MacDONALD AND GEORGE E. SLY, OF SHAKOPEE, MINNESOTA.

THRASHING-MACHINE.

SPECIFICATION forming part of Letters Patent No. 253,874, dated February 21, 1882.

Application filed October 31, 1881. (No model.)

*To all whom it may concern:*

Be it known that we, JOHN L. MACDONALD and GEORGE E. SLY, of Shakopee, in the county of Scott and State of Minnesota, have invented certain Improvements in Thrashing-Machines, of which the following is a specification.

Our invention relates to grain thrashing and separating machines; and the improvements consist in various features and details of construction, hereinafter fully set forth.

The various improvements will be pointed out in the course of the following description and claims.

In the accompanying drawings, Figure 1 represents a side elevation of our improved machine, partly in section, to show the internal construction; Fig. 2, an enlarged sectional view of the cylinders and concaves, showing also the dust-boards. Fig. 3 is a rear end view of the machine; Fig. 4, a side view of the mechanism employed for operating the screening-shoe and in some cases the straw-carrier; Fig. 5, a view showing in detail the construction of the rear thrashing-cylinder.

It has been found in the practical use of thrashing-machines that a considerable amount of grain remains attached to the stalks and passes from the machine with the straw to the stacker, thus materially lessening the yield of grain. To remedy this difficulty two cylinders have been employed, arranged to act successively upon the grain, and the result has been a considerable increase in the quantity of grain. As hitherto constructed, however, the detached grain collected in the space between the concaves, and, besides being broken and injured, tended to clog the passage of the straw through the machine. To overcome this difficulty we employ between the two concaves a slatted or perforated bottom or connecting-section, through which the loose grain may fall, but by which the straw is held up from the grain-conveyer and caused to pass under the second cylinder to the straw-carrier.

It is desirable in thrashing-machines to impart to the straw-carrier a shaking motion which shall serve to loosen up the straw and permit the detached grain to fall out, and which shall also cause the straw to move toward the delivery end of the carrier as rapidly as is consistent with a thorough accomplishment of the above-stated object. For this purpose the carrier has been hung or mounted upon cranks; but it is found in actual use that in order to secure the necessary vertical movement of the carrier by this means it is necessary to give so great a throw thereto in the direction of its length that the straw is discharged before the grain is thoroughly shaken out of it. Referring now to the drawings, these and other features of construction will be more fully explained.

A represents the framing of the machine, of substantially the ordinary form and construction, and B C the thrashing-cylinders, working in conjunction with adjustable concaves D and E, pivoted at their rear sides, and resting at their forward sides upon eccentrics $a$, carried by cross-shafts $b$, furnished with levers $c$, which move over and lock fast to segments $d$, to hold the concaves at any desired adjustment.

Between the concaves D and E is a stationary slatted section, $e$, over which the straw passes from one concave to the other, and through which the detached grain may fall to the carrier below, thus preventing the accumulation of grain between the concaves. In passing successively under the two cylinders the grain is completely detached from the straw, and a large proportion of the detached grain is delivered through the perforated or grated concaves and the intervening grated section, the second cylinder serving in a great measure to shake out the loose grain, thus leaving a comparatively small quantity to be subsequently shaken from the straw by the straw-carrier.

Above each cylinder, and in front of the same, are dust-boards $f$ and $g$, preferably adjustable, which serve to prevent the dust from being blown out into the face of the man operating the machine. The second cylinder also tends to overcome the blowing outward of the dust by creating a downward draft through the slatted section between the concaves, and thus arresting the dust which otherwise would follow around the cylinder B and be thrown over its top. The second cylinder, C, is formed with the usual central shaft or arbor, carrying heads at its ends, and the teeth are secured to longitudinal bars $a'$, which are retained in place by annular bands or rings $b'$. In order that the cylinder may present a smooth exterior, and thus afford but little resistance to the wind, the bars $a'$ are grooved or beveled to receive curved plates $c'$, of sheet metal, which are of proper width to fill the space between the bars and to bear against the ring, in which position they are held by bolts passing through the ring and into the head, as shown in Fig. 5. This arrangement also serves to prevent the straw from winding in upon the cylinder-shaft, and overcomes in a measure the fan action of the cylinder.

In rear of the second cylinder, C, there is located a horizontal rotary beater, F, beneath which the straw passes from said cylinders to the straw-carrier G, and by which the straw is straightened out and thrown upon the carrier.

The straw-carrier G consists of a transversely-slatted bed or platform, suspended by four arms or levers, $h$, two at or near each end, on opposite sides, which arms are so actuated as to give to the platform a motion upward and forward, downward, and backward, the upward and downward movement considerably exceeding the forward and backward movement. To produce this action the arms or levers $h$ are attached to cranks $i$ or eccentrics of cross-shafts $j$, journaled in boxes in the upper part of the framing of the machine, and are also arranged to swing upon a shifting fulcrum at a point between their ends. This may be accomplished in either of two ways, which are to a certain extent equivalents of each other, but one of which possesses advantages not afforded by the other. These two plans are, first, pivoting the arms or levers $h$ each to a swinging arm or bar, $k$, pivoted at one end to the framing, as shown in Fig. 1; secondly, slotting the arms or levers $h$ and causing them to rise, fall, and swing about a fixed stud or pin, $l$, as shown in Fig. 4. The first-mentioned plan possesses all the advantages of action found in the second, yet is perhaps a trifle more expensive, though it is not merely the equivalent of the second form, but is a decided improvement thereon, since by adjusting the pivot $m$ up or down, for which purpose the arms $h$ and post of frame A are furnished with series of holes, the horizontal throw of the platform or carrier may be regulated or varied at will, the throw of the operating-cranks, and consequently the rise and fall of the platform or carrier, remaining unchanged.

The peculiar action of the straw carrier or platform is of great importance, as it violently shakes or agitates the straw without too rapidly carrying it from the machine, and thus effectually shakes out the loose grain.

The crank-shafts $j$ are each formed with three cranks—two at opposite sides of the machine, to carry the arms or levers $h$, and the third one, $n$, at right angles, or substantially so, to the first two, as shown.

One crank, $i$, of each shaft is connected by a pitman, $o$, with the corresponding crank of the other shaft, and the cranks $n$ of the two shafts are similarly connected by a pitman, $q$, to cause the shafts to rotate in unison, and in order to prevent one shaft from merely rocking while the other rotates.

The shafts are provided with balance-wheels $r$, weighted on the side opposite the cranks $i$, in order to counteract the descent of the platform or carrier G, and to cause an even and regular motion of the parts of the machine.

The grain which falls through the concaves and the intermediate slatted section, and that which is shaken from the straw and falls through the straw-carrier, is received upon a platform beneath an open-slatted rake, which travels about drums or pulleys $s$ and delivers the grain to the shaking-shoe H, where it is properly screened and separated, during which operation it is subjected to the action of the fan I.

The screens may be varied according to the quality or kind of grain operated on, and the shoe has imparted to it a motion similar to that of the straw-carrier. For this purpose the forward or receiving end of the shoe is suspended by links $t$, while its rear end is carried by arms or levers $u$, attached at their upper ends to crank-wheels $v$, and each slotted about its middle to play about a fixed stud, $l$, as shown in Figs. 1 and 3, and in connection with the straw-carrier in Fig. 4. The studs are adjustable to vary the throw of levers $u$. This motion causes the grain to be agitated and to travel over or fall through the sieves or screens. It also causes the straw or other matters which pass off at the tail of the upper screen to travel over the hinged rake $w$ to the extension $x$ of the shoe, which contains a series of transverse ribs or corrugations, as shown, by which the matters delivered thereon are prevented from moving back again toward the screens, but are caused to move to the end of said extension, whence they fall upon the stacker belt or apron.

Beneath the screen of the shaking-shoe is a chute-board, $y$, which delivers the grain falling through the screens to a spout or trough, $z$, containing a spiral conveyer, $z'$. At the lower and rear side of the shoe is a tailings-trough, J, carried at one end by an elbow-lever, K, pivoted to the framing of the machine at the junction of the two arms, which arms are connected, one by a link, L, to the crank-pin of wheel $v$, and the other to one end of the tailings-trough. The delivery end of said trough is supported upon an upright rocking standard or leg, M, and discharges into an elevator-trunk in the ordinary manner. The bottom of the trough is stepped or corrugated, as shown in Fig. 3, so that the grain thrown toward the delivery end of the trough while the latter moves forward is prevented from moving back as the trough returns.

Such parts as are not specifically explained may be of ordinary construction.

If desired, the arrangement of levers shown in Fig. 1 for operating the straw-carrier may also be employed for imparting motion to the shoe.

The shafts of the cylinders B C are furnished respectively with pinions $d'$ $e'$, both of which receive motion in the same direction from a gear-wheel, $f'$, on the main driving-shaft $g'$.

Power may be applied to the machine from any convenient prime motor by wire rope, chain, belt, or tumbling-rod, though in practice we prefer to employ wire rope, in which case the shaft $g'$ is furnished at one end with a V-grooved band-wheel, $h'$.

The tailings-elevator is driven by a belt from a pulley on the shaft of cylinder B, and the grain-conveyer is driven from another pulley on the opposite end of the same shaft by a belt. The rotary beater F is driven by a belt from a pulley on the shaft of cylinder C, and the forward counterbalanced wheel $r$ of the straw-carrier mechanism is driven by a belt from a pulley at the opposite end of this shaft. The fan I is driven by a belt from a pulley on the main shaft $g'$, and the conveyer $z'$ is driven by a belt from a pulley on the fan-shaft.

The rear counterbalanced wheel $r$ is belted to a pulley on the rear drum-shaft of the grain-conveyer.

It is apparent that the straw-carrier may be located above the arms or levers $h$ and the crank-shafts below the same.

The stud $l$ may be provided with an anti-friction ferrule or collar.

We are aware that a transverse grain trough or spout at the rear end or side of a shaking shoe has been provided with a series of steps or abutments to prevent the backward movement of the grain therein; but we are not aware that a shaking-shoe has ever before been provided with a ribbed and imperforate extension such as we have shown and described.

Having thus described our invention, what we claim is—

1. In a thrashing-machine, the combination of two thrashing-cylinders, one arranged to deliver the straw directly to the other, concaves located beneath the respective cylinders, and an intermediate slatted section, substantially as described.

2. In combination with the cylinders B C, concaves D E, the dust-board $g$, located between them and serving to direct the dust downward, and the slatted section between the respective concaves, substantially as shown and described.

3. In a thrashing-machine, the combination of the two thrashing-cylinders B C, arranged, as described, to act conjointly upon the grain, and independently-adjustable concaves D E, for the respective cylinders, substantially as shown and described.

4. In combination with the cylinders B C, the independently-adjustable concaves D E and the wind-boards $f$ and $g$, all combined and operating as set forth.

5. In a thrashing-machine, the combination of revolving cranks or eccentrics, a straw-carrier, sustaining and operating arms or levers connected at one end to the carrier and at the opposite end to said revolving cranks or eccentrics, said arms having a shifting fulcrum at a point between the two points of attachment, and the parts being combined and operating substantially as described.

6. In combination with the straw-carrier, sustaining-arms jointed thereto, revolving cranks carrying said arms, and pivoted arms jointed at one end to the sustaining-arms at a point between the ends of the latter, and pivoted at the opposite end.

7. In combination with a straw carrier or platform and cranks $i$, arms $h$, provided with perforations, connected at their opposite ends with the cranks $i$ and the straw-carrier, respectively, and the arms $k$, jointed to the arms $h$, and pivoted to the framing of the machine.

8. The combination, in a thrasher, of a straw carrier or platform, G, sustaining and operating arms $h$, swinging arms $k$, jointed to arms $h$, shafts $j$, provided with cranks $i$ and $n$, and the pitmen $o$ and $q$, all arranged and operating as set forth.

9. In combination with the arms $h$, connected with cranks at one end, the arms $k$, adapted and arranged to be adjusted substantially as shown and described.

10. In combination with a screening-shoe, a revolving crank or eccentric, a lever connected at one end with said revolving crank or eccentric and at the opposite end with the shoe, and arranged to oscillate and move endwise upon its fulcrum, whereby an elliptical motion in a vertical plane is produced.

11. In combination with the shaking-shoe of a thrashing-machine, the slotted levers $u$, crank-wheels $v$, and studs or pins $l$, located between the crank-wheels and the shoe, as and for the purpose set forth.

12. In combination with the straw-carrier G, the arms $h$ and $k$, cranks $i$ and $n$, and pitmen $o$ and $q$, the weighted wheels $r$, applied to the crank-shafts as and for the purpose set forth.

13. A shaking-shoe provided in rear of the tailings-trough with a corrugated or ribbed extension, closed on its lower side to prevent the return of matters to the screens or tailings-trough.

14. In a thrashing-machine, the combination of a tailings-trough, an upright pivoted prop or support at one end thereof, and an elbow-lever connected with the opposite end and with a rotating crank, substantially as shown.

15. The herein-described thrashing and separating machine, consisting of the cylinders B C and concaves D E, beater F, straw-carrier G, sustaining and operating arms *h*, cranks *i*, carrier-belt, screening-shoe H, and fan I, all combined and operating as set forth.

16. In a thrashing-machine, the combination, with a vertically-moving straw-carrier and screening devices, of a crank or eccentric, and one or more slotted arms connected at one end with the crank or eccentric and at the other with the screening devices, and arranged to move about a fixed stud extending through its slot.

17. In combination with a screening device, a crank or eccentric, and a slotted lever connected positively at one end with said crank or eccentric and at the other end with the screening device, a pin or stud extending through the slot and adapted to be adjusted therein and to be secured rigidly in its adjusted position, substantially as set forth, whereby an elliptical movement of varying scope may be imparted to the end of the lever connected with the screening devices.

JOHN L. MACDONALD.
GEORGE E. SLY.

Witnesses:
THEODORE WEILAND,
RODERICK O'DOWD.